United States Patent Office 2,983,145
Patented May 9, 1961

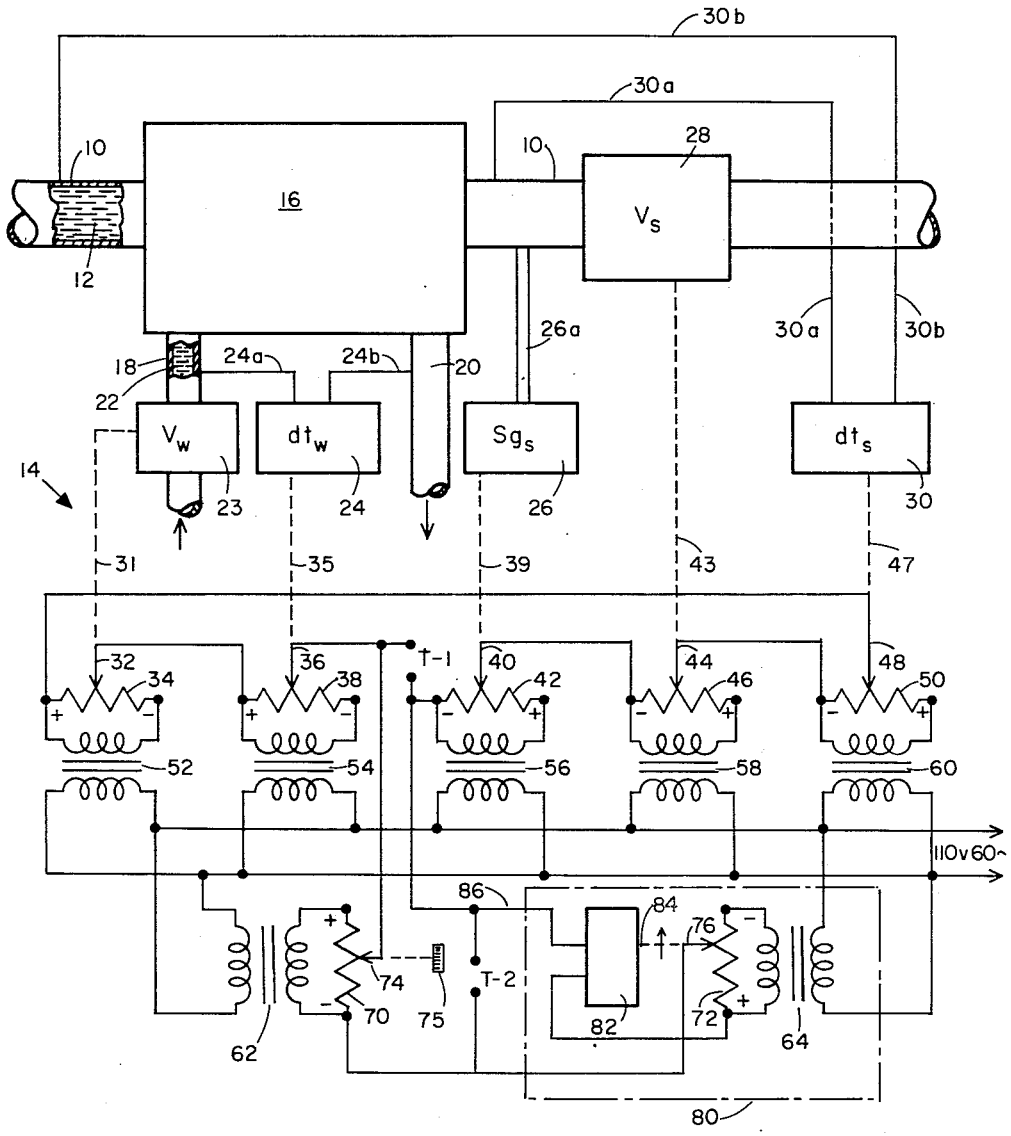

2,983,145
SPECIFIC HEAT INDICATOR

Frederick L. Horn, Sayville, and John E. Binns, Roslyn, N.Y., assignors to the United States of America as represented by the United States Atomic Energy Commission Filed Sept. 9, 1958, Ser. No. 760,048

5 Claims. (Cl. 73—193)

The present invention relates to apparatus for determining specific heat and, more particularly, to electrical apparatus for continuously measuring and computing the specific heat of a flowing solution.

In certain continuous chemical processes the composition of a flowing solution may vary and thereby require a corresponding change in the treatment to which it is subjected. One indication of a change in composition is a change in specific heat, the determination of which requires particular data on the rate of flow of the solution, its specific gravity, and its ability to transfer heat, from which the calculations are made to determine this characteristic. Heretofore, measurements and readings have been made at particular intervals, followed by the necessary calculations, so it was only possible to make spot checks on the operation of the process. One inherent disadvantage of this way of determining the specific heat of continuously flowing solutions lies in the time which must elapse between measurement and determination during which conditions might change. Another disadvantage is that unless measurements and calculations are being made continuously, no complete picture of the solution is possible, with the attendant lack of precise control over the chemical process going on.

These and other disadvantages of the aforementioned technique of computing the specific heat of a continuously flowing solution are overcome by the instant invention which, briefly described, comprises apparatus for measuring the various parameters necessary to compute specific heat and automatically combining them to produce the desired information, in continuous form. For this purpose, there is provided in one preferred embodiment a liquid cooled heat exchanger in heat exchange relationship with the flowing solution. The apparatus takes data from the heat exchanger and the flowing solution and, by the use of a novel arrangement including logarithmic potentiometers, continuously solves the equation (1) $\quad Cp = (V_w \times dt_w)/(sg_s \times V_s \times dt_s)$ where $Cp$ is the specific heat of the solution being determined,
$V_w$ is the volumetric rate of flow of the coolant (water),
$dt_w$ is the temperature rise of the coolant,
$sg_s$ is the specific gravity of the solution,
$V_s$ is the volumetric rate of flow of the solution, and
$dt_s$ is the temperature drop of the solution.

The above data furnished by suitable sensing instruments which supply electrical signals for solving the equation, as described in detail further below.

It is thus a first object of this invention to provide apparatus for automatically and continuously determining the specific heat of a liquid solution.

It is a further object of this invention to provide apparatus for the automatic and continuous determination of the specific heat of a liquid solution employing a plurality of logarithmic potentiometers representing the particular parameters undergoing measurement for carrying out the mathematical operations involved.

It is still another object of this invention to provide a null-seeking analog computer utilizing a plurality of logarithmic potentiometers and additional means for eliminating ambiguities arising out of values less than unity.

These and other objects will become more readily apparent from the following description of the drawing which is a schematic illustration of a preferred form of this invention.

Referring to the drawing, there is shown a conduit 10 for conveying a liquid solution 12 which is subject to the measurement of specific heat by the inventive apparatus generally indicated by 14. Mounted in a manner understood in the art is a liquid cooled heat exchanger 16 of convenient and conventional design having inlet and outlet pipes 18 and 20, respectively, for permitting ingress and egress of the coolant 22, which in this arrangement is water. It is understood that heat exchanger 16 may be a heater and that heat can be transferred to solution 10 instead of extracted.

For the purposes of measuring and indicating the various parameters involved, there are provided a plurality of instruments described below. A conventional or commercially available volumetric flowmeter 23 such as the Rotameter produced by Schutte & Koerting Co. may be located in line 18 to measure and indicate the volumetric flow of coolant 22. By a common mechanical connection 31 schematically illustrated, instrument 23 is connected to move wiper 32 of a logarithmic potentiometer 34 to position the former in accordance with the magnitude of flow measured by flowmeter 23. As is understood in the art, potentiometer wiper 32 will select a signal which is proportional to the logarithm of this magnitude. A conventional temperature measuring instrument 24, such as a Thermocouple Temperature Recorder manufactured by the Brown Instrument Co., is connected as illustrated schematically by electrical lead lines 24a and 24b to measure the temperature changes occurring in coolant 22 as a result of its passage through heat exchanger 16. In a manner similar to that described in connection with flowmeter 23, temperature measuring instrument 24 by the mechanical linkage 35 positions wiper 36 on a logarithmic potentiometer 38 to select a logarithmic signal in proportion to the magnitude of the temperature change which is produced in coolant 22. A third instrument 26, which may be the Liquid Level Transmitter manufactured by the Moore Products Co., is connected by sampling tube 26a or other convenient means to conduit 10 and measures the specific gravity of solution 12 and positions, through mechanical linkage 39, wiper 40 on logarithmic potentiometer 42 to produce a proportional logarithmic signal as a result thereof. A fourth instrument, flowmeter 28, also of conventional design, is located in solution conduit 10 for the purpose of measuring and indicating the volumetric flow of solution 12 therethrough and, in a manner similar to the previous instruments described, will position via mechanical connection 43 the wiper 44 of logarithmic potentiometer 46. A fifth and final measuring instrument, a temperature measuring device 30 of common variety, is provided to measure the temperature change of solution 12 as a result of its passage through heat exchanger 16. A pair of electrical lead connections 30a and 30b is provided for this purpose. Instrument 30 positions via linkage 47 the wiper 48 on logarithmic potentiometer 50 to produce a logarithmic signal in proportion to the magnitude of the temperature change measured by instrument 30. Recording instruments 23, 24, 26, 28 and 30 as already indicated are all well known in the art and may be selected in accordance with the range of operating conditions and the particular needs of the solution and other conditions in service.

For the purpose of energizing potentiometers 34, 38, 42, 46 and 50, there is provided a plurality of associated transformers 52, 54, 56, 58 and 60. It will be seen from the drawing that the primary coils of these transformers along with additional transformers 62 and 64 to be described further below are connected in parallel across a 110-volt, 60-cycle source for energization. The secondary coils of these transformers are connected across their associated potentiometer windings to produce the full voltage thereacross. It will be noted from the use of signs to indicate phase at the ends of the potentiometers that the various potentiometer windings are electrically connected together in a particular fashion to be now described. In order to carry out the multiplication and division operations of the formula given above for specific heat, wiper 32 is connected electrically to the positive end of potentiometer 38. The positive end of potentiometer 34 is connected to wiper 48 of potentiometer 50; wiper 44 is connected to the negative end of potentiometer 50; and wiper 40 is connected to the negative end of potentiometer 46. By this arrangement, it is seen that the alternating voltage signals on potentiometers 34 and 38 are additive (in phase) with respect to each other, while in a similar fashion the signals on potentiometers 42, 46 and 50 are also additive with respect to each other. However, the sum of the signals selected by wipers 32 and 36 are subtractive (out of phase) with respect to the sum of the signals on wipers 40, 44 and 48 when measured between wiper 36 and the negative end of potentiometer 42, to satisfy the relation (2) $\log Cp = \log V_w + \log dt_w - (\log sg_s + \log V_s + \log dt_s)$ A pair of contacts T-1 are connected respectively to wiper 36 and to the negative end of potentiometer 42. Across contacts T-1, an alternating current voltage will thus appear representative of the logarithmic value of specific heat. However, because it is not readily possible to determine the phase of the signal or its significance if it is determined, the resulting signal across contacts T-1 will be ambiguous since it will not be obvious whether the specific heat ($Cp$) is greater or less than unity depending upon whether the logarithmic value thereof is positive or negative as indicated by the phase of the signal. To eliminate this ambiguity and to obtain additional benefits hereinafter described, it will be noted from the drawing that between potetiometers 38 and 42 (across contacts T-1) there is provided additional circuitry including a pair of potentiometers 70 and 72 having wipers 74 and 76, respectively. Potentiometers 70 and 72 are energized in a fashion similar to the other potentiometers by their transformers 62 and 64, respectively. It will be seen that potentiometer 70 is connected in the arrangement so as to introduce a signal which may be described for the present as the logarithmic value of a constant K selected by the manual positioning of wiper 74 by a knob 75. This signal is additive (in phase) with respect to those on potentiometers 34 and 38. The voltage added by potentiometer 70, as noted, represents the logarithm of a factor K by which $Cp$ is multiplied, and the voltage across the terminals T-2 would thus be indicated by the expression (3) $\log KCp = \log \dfrac{KV_w dt_w}{sg_s V_s dt_s}$ Wiper 74 would be positioned manually to select log K in a manner which will be described further below. In this way, the phase of the signal across contacts T-1 will never change, and the specific heat as computed will be multiplied by some constant K, identified above.

Potentiometer 72 is connected to introduce a signal opposite in phase to that of K. For this purpose it is part of a general construction 80 which may be, for example, a Potentiometer Recorder manufactured by Brown Instrument Co. designed to position wiper 76 to select a signal equal and opposite in phase to the input signal found across a pair of contacts T-2 connected between wiper 76 and line 86. The position of wiper 76 is thereby directly indicative of the value of this input signal, or, in other words, $KCp$. Apparatus 80 comprises a circuit generally indicated by 82 which utilizes an amplifier and servo motor (not shown) to move wiper 76 through a linkage 84 in accordance with the signal between wiper 76 and lead 86 to select a voltage in opposition to the input signal and cancel the latter. The input signal to instrument 80 is understood to be the resultant of all the operations already described, or log $KCp$. The arrangement 80 insures stabilization of the voltage on contacts T-2, or, that no current flow will be produced to affect the voltage on contacts T-2, thereby making the apparatus 14 a null-seeking or self-balancing type of high accuracy.

In the operation of the apparatus described above, the particular setting of wiper 74 (selection of K) is obtained as follows: Each of wipers 32, 36, 40, 44 and 48 is calibrated in its respective potentiometer to reflect accurately its respective instrument. Values for the settings of the group of potentiometers 34, 38, 42, 46 and 48 are arbitrarily set and the specific heat is calculated. Wiper 74 is adjusted so that recorder 80 presents the calculated reading, and then K as determined by the position of wiper 74 may be calculated. Wiper 76 may be provided with a log conversion dial (not shown) for reading directly in specific heat.

It is thus seen that there has been provided apparatus for producing the continuous and accurate measurement of the specific heat of a flowing solution, making the apparatus particularly adaptable for use in chemical processes. As a result, changes in the process required by variations in specific heat can be brought about quickly and efficiently without disturbing or interrupting the flow of the solution undergoing chemical treatment. Furthermore, it is seen that with the use of this invention no handling of the solution undergoing measurement is required as in the other ways of measuring specific heat, previously mentioned. This is an important feature of the invention when the fluid being processed is highly corrosive or otherwise difficult to handle, as for example the materials described in U.S. Patent No. 2,830,874, including uranium hexafluoride.

Obviously many modifications and variations of the present invention are possible in the light of the above teachings. For example, it has already been noted that the apparatus described above is designed for use where the coolant is water having a specific gravity of unity to which solution 12 is compared. However, the apparatus can be adapted for use with other coolants by incorporating two additional potentiometer voltage suppliers. One of these can be manually adjusted to provide a voltage equivalent of the logarithm of the specific heat of the coolant other than water and the second actuated by a device similar to instrument 26 to indicate the specific gravity of the coolant and provide a voltage representing the logarithm of said specific gravity. So modified the circuit would then solve the equation (4) $Cp_s = (Cp_c \times sg_c \times V_c \times dt_c) / (sg_s \times V_s \times dt_s)$ wherein the subscript $c$ pertains to the coolant and the subscript $s$ pertains to the solution.

It is therefore to be understood that within the scope of the appended claims the invention may be practiced otherwise than as specifically described.

We claim:
1. Apparatus for providing an indication of the specific heat of a flowing solution comprising, in combination, means for placing a flowing liquid in heat exchange relationship with said solution, first means for providing an alternating voltage as a function of the volumetric rate of flow of said liquid, second means for providing an alternating voltage as a function of the temperature change of said liquid due to said heat exchange relationship, third means for providing an alternating voltage as a function of the specific gravity of said solution, fourth means for providing an alternating voltage as a function of the volumetric rate of flow of said solution, fifth means for providing an alternating voltage as a function of the temperature change of said solution due to said heat exchange relationship, and means for producing a final voltage in proportion to the product of said voltages produced by said first and second means and in inverse proportion to the product of said voltages produced by said third, fourth and fifth means representative of said specific heat.

2. Apparatus for determining the specific heat ($Cp$) of a flowing solution comprising, in combination, means for placing a flowing liquid in heat exchange relationship with said solution, first means for providing an alternating voltage as a function of the logarithm of the volumetric rate of flow ($V_w$) of said liquid, second means for providing an alternating voltage as a function of the logarithm of the temperature change ($dt_w$) of said liquid due to said heat exchange relationship, third means for providing an alternating voltage as a function of the logarithm of the specific gravity ($sg_s$) of said solution, fourth means for providing an alternating voltage as a function of the logarithm of the volumetric rate of flow ($V_s$) of said solution, fifth means for providing an alternating voltage as a function of the logarithm of the temperature change of said solution ($dt_s$) due to said heat exchange relationship, and means for combining said voltages in accordance with the relation $$Cp = \frac{V_w dt_w}{sg_s V dt_s}$$

and thereby provide a voltage indicating said specific heat.

3. Apparatus for providing an indication of the specific heat of a flowing solution comprising in combination, means for placing a flowing liquid in heat exchange relationship with said solution, first means for providing an alternating voltage proportional to the logarithm of the volumetric rate of flow of said liquid, second means for providing an alternating voltage proportional to the logarithm of the temperature change of said liquid due to said heat exchange relationshhip, third means for providing an alternating voltage proportional to the logarithm of the specific gravity of said solution, fourth means for providing an alternating voltage proportional to the logarithm of the volumetric rate of flow of said solution, a fifth means for providing an alternating voltage proportional to the logarithm of the temperature change of said solution due to said heat exchange relationship, means for producing a final voltage in proportion to the product of said voltages produced by said first and second means and in inverse proportion to the product of said voltages produced by said third, fourth and fifth means representative of said specific heat, and means for adding a predetermined constant voltage of sufficient magnitude to be combined with the other said voltages for insuring a particular phase of said final voltage.

4. Apparatus for providing an indication of the specific heat of a flowing solution comprising in combination, means for placing a flowing liquid in heat exchange relationship with said solution, first means for providing an alternating voltage proportional to the logarithm of the volumetric rate of flow of said liquid, second means for providing an alternating voltage proportional to the logarithm of the temperature change of said liquid due to said heat exchange relationship, third means for providing an alternating voltage proportional to the logarithm of the specific gravity of said solution, fourth means for providing an alternating voltage proportional to the logarithm of the volumetric rate of flow of said solution, a fifth means for providing an alternating voltage proportional to the logarithm of the temperature change of said solution due to said heat exchange relationship, means for summing said voltages produced by said first and second means and subtracting said voltages produced by said third, fourth and fifth means and producing a final voltage indicative of said specific heat, and null-seeking means for adding a voltage opposite in phase and equal in magnitude to said final voltage and thereby reduce current flow and stabilize the magnitude of said final voltage.

5. Apparatus for providing an indication of the specific heat of a flowing solution comprising in combination, means for placing a flowing liquid in heat exchange relationship with said solution, first means for providing an alternating voltage proportional to the logarithm of the volumetric rate of flow of said liquid, second means for providing an alternating voltage proportional to the logarithm of the temperature change of said liquid due to said heat exchange relationship, third means for providing an alternating voltage proportional to the logarithm of the specific gravity of said solution, fourth means for providing an alternating voltage proportional to the logarithm of the volumetric rate of flow of said solution, a fifth means for providing an alternating voltage proportional to the logarithm of the temperature change of said solution due to said heat exchange relationship, means for summing said voltages produced by said first and second means and subtracting said voltages produced by said third, fourth and fifth means and producing a final voltage indicative of said specific heat, means for adding a predetermined constant voltage of sufficient magnitude to be combined with the other said voltages for insuring a particular phase of said final voltage, and null-seeking means for adding a voltage opposite in phase and equal in magnitude to said final voltage and thereby reduce current flow and stabilize the magnitude of said final voltage.

References Cited in the file of this patent

UNITED STATES PATENTS 1,573,850    Naiman _____ Feb. 23, 1926

FOREIGN PATENTS 235,651    Switzerland _____ May 1, 1945

OTHER REFERENCES

31 Ways to Multiply, by Sidney A. Davis, Control Engineering, vol. 1, No. 3, November 1954.